United States Patent [19]

Ritchey

[11] Patent Number: 4,656,506
[45] Date of Patent: Apr. 7, 1987

[54] SPHERICAL PROJECTION SYSTEM
[76] Inventor: Kurtis J. Ritchey, R.R. 3, Box 525, Leavenworth, Kans. 66048
[21] Appl. No.: 822,648
[22] Filed: Jan. 27, 1986

Related U.S. Application Data

[63] Continuation-in-part of Ser. No. 457,876, Feb. 25, 1983, abandoned, which is a continuation-in-part of Ser. No. 346,509, Feb. 8, 1982, abandoned.
[51] Int. Cl.$^4$ .............................................. H04N 9/31
[52] U.S. Cl. .................................. 358/87; 358/237; 358/60; 352/70; 353/82
[58] Field of Search ............... 434/40, 43, 44, 284; 272/1 C, 16, 17, 18; 358/60, 87, 104, 237, 238, 239, 231; 350/125; 353/37, 82; 354/94, 95; 352/69, 70, 71

[56] References Cited

U.S. PATENT DOCUMENTS

| | | | |
|---|---|---|---|
| 2,299,682 | 10/1942 | Conant | 350/125 |
| 2,320,760 | 6/1943 | Surre | 350/123 |
| 2,779,237 | 1/1957 | Smith | 88/24 |
| 2,861,806 | 11/1958 | Disney | 352/34 X |
| 3,055,265 | 9/1962 | Smith | 352/70 |
| 3,107,577 | 10/1963 | Adams | 352/70 |
| 3,246,943 | 4/1966 | Holt | 352/86 |
| 3,248,165 | 4/1966 | Marks et al. | 352/61 |
| 3,292,491 | 12/1966 | Hourdiaux | 88/24 |
| 3,311,017 | 3/1967 | Eckholm | 358/87 X |
| 3,695,751 | 10/1972 | Watanuki | 352/70 |
| 3,768,899 | 10/1973 | Adiego De La Parra | 353/82 |
| 3,807,849 | 4/1974 | Lobb | 353/98 |
| 3,867,024 | 2/1975 | Smith | 353/82 |
| 4,100,571 | 7/1978 | Dykes et al. | 358/87 |
| 4,127,322 | 11/1978 | Jacobsen et al. | 353/37 X |
| 4,164,829 | 8/1979 | Sadler | 434/284 X |
| 4,167,311 | 9/1979 | Pund | 350/125 |
| 4,181,918 | 1/1980 | Warman et al. | 358/237 |
| 4,191,456 | 3/1980 | Hong et al. | 353/37 X |
| 4,208,676 | 6/1980 | Berwick et al. | 358/237 |
| 4,234,894 | 11/1980 | Tokumaru et al. | 358/250 |
| 4,266,242 | 5/1981 | McCoy | 358/183 X |
| 4,334,245 | 6/1982 | Michael | 358/183 |
| 4,355,328 | 10/1982 | Kulik | 358/87 |

FOREIGN PATENT DOCUMENTS 2445567  7/1980  France .................................. 434/40
1047728 11/1966  United Kingdom .

OTHER PUBLICATIONS

P. Gessler, "Polyvisions", *Camera;* Jun. 1964, pp. 13-18.
T. Herzog, *Pneumatic Structures,* Crosby Lockwood Staples, London, 1977, pp. 149, 158, & 159.
Model IMI-3000, -3000GG, & Magni Image I by Image Magnification, Inc, The 1981 Video Products Guide, vol. III, p. 230, (published by Midwest Corporation).
Model 200-3 Video Production Switcher by Industrial Sciences, Inc., *The 1981 Video Productions Guide,* vol. III, p. 230, (published by Midwest Corporation).
"Squeezer", Video Image Compression System, by Precision Echo, California.
W. E. Good, "Recent Advances in the Single-Gun Color Television Light-Valve Projector", *Simulators & Simulation,* vol. 59, pp. 96-99, Society of Photo-Optical Instrumentation Engineers.

*Primary Examiner*—Howard W. Britton
*Assistant Examiner*—Victor R. Kostak
*Attorney, Agent, or Firm*—Litman Day & McMahon

[57] ABSTRACT

A spherical projection system includes a spherical rear projection screen assembly of an extent such that a viewer sees projected images in any viewable direction, a plurality of image projectors which cooperate to project portions of a continuous panoramic scene onto all the viewable surfaces of the screen assembly, sets of mirrors to reflect the images onto associated areas of the screen assembly, and an opaque enclosure which houses the screen assembly, mirror sets, and image projectors. In one embodiment of the system, the screen assembly includes a truncated spherical portion which is sized to receive a viewer entirely within and which is closed by a planar rear projection screen which forms a floor to support the viewer. A separable section of the spherical screen portion is mounted on a track for sliding movement to allow entry and exit by the viewer. In another embodiment of the system, the spherical screen is sized to receive only the head and upper body of the viewer. The spherical screen is rotatably mounted to allow the viewer to turn it to see all portions of the projected images.

15 Claims, 18 Drawing Figures

SPHERICAL PROJECTION SYSTEM

CROSS-REFERENCE TO RELATED APPLICATIONS

This is a continuation-in-part of Ser. No. 457,876 for REAR SCREEN PROJECTION SYSTEM AND METHOD filed Feb. 25, 1983 and now abandoned, which was a continuation-in-part of Ser. No. 346,509 for REAR SCREEN PROJECTION SYSTEM AND METHOD filed Feb. 8, 1982 and now abandoned.

FIELD OF THE INVENTION

The present invention relates to image display systems and, more particularly, to systems for projecting images onto the external surfaces of spherical rear projection screens for viewing from within, such that the viewer sees a continuous panoramic scene in all viewable directions.

BACKGROUND OF THE INVENTION

There have been many attempts and approaches to increase the perceived realism of projected images. The simplest approaches involved merely color photography, larger screens, and more intense projection light sources. Later techniques included wide aspect ratio formats. Still later attempts involved curved screens of both cylindrical and spherical shape. In most curved screen projection techniques, the images are projected onto the concave side of the screen, although there have been systems in which the images are projected onto the convex side of curved screens.

One of the problems with projecting images onto curved screens is that the images are stored on flattened film such that distortions of the images occur in projecting them onto curved screens. One solution to this problem is to use multiple projectors to display portions of the total picture. However, there are complexities involved in seaming the image portions together to result in a continuous panorama. Another solution is to predistort the images as they are being recorded onto the film, or image sensor array in the case of video images, to compensate for the projection distortions.

In the field of curved screens, the majority have been cylindrical with some extending 360 degrees about the viewers' position. The majority of spherical screens have been less than entire spheres and have been illuminated with images projected onto the inner or concave surfaces of the screens. At least one known spherical screen is a single viewer hemispherical screen with the images rear screen projected onto the outer or convex side of the screen. One arrangement of a rear projected quasi-hemispherical screen for multiple viewers is known which is formed of a plurality of joined planar screens with a projector for each planar section.

In all the known spherical type screen arrangements, there are viewable nonprojected areas such that a viewer could turn in some direction and not see a portion of the projected images. As far as is known, there have been no spherical projection systems which completely surround a viewer such that, in any direction to which a viewer could turn, the viewer would see a portion of the screen.

SUMMARY OF THE INVENTION

The present invention provides spherical rear projection systems which encompass all directions viewable by a viewer. In a first embodiment of the invention, the screen is a truncated spherical rear projection screen which is closed at its lower side by a planar rear projection screen. The screen assembly is sized to receive a viewer entirely within the assembly. One segment of the screen is mounted on a track to separate from the remaining portions to thereby allow a viewer to enter into and exit from the screen assembly. The lower planar screen section is strong and rigid enough to support the weight of the viewer and a chair which positions the viewer's head at the center of the spherical portion of the screen. The spherical screen assembly is supported within an opaque enclosure. A plurality of image projectors such as photographic projectors or video projectors are positioned to project portions of a continuous panoramic scene onto all sides of the screen assembly such that a viewer or operator sees the projected images in any viewable direction. Preferably, the images are reflected onto the screen by mirror sets positioned within the enclosure. The enclosure and supports for the screen assembly are adapted such that components thereof do not interfere with the projected or reflected images.

In a second embodiment, the spherical portion of the screen assembly is formed of a flexible rear screen projection material which is loosely supported within the enclosure and which is principally supported by air pressure communicated into the interior of the screen assembly. Entry into the screen assembly is accomplished by unzipping a portion of the screen, the zipper extending out of the view of the operator.

In a third embodiment of the spherical projection system, the spherical rear projection screen is sized and adapted to surround only the head and upper body of the viewer and to have the screen surface at a comfortable viewing distance from the viewer's eyes. The spherical screen is rotatably mounted within an opaque enclosure for rotation about a vertical axis such that the viewer may turn the screen in an azimuthal direction. One manner of projecting images onto the screen is by displaying the portions of panoramic scenes and images on a single video screen and, using projector lenses and mirror sets, transferring the image portion onto respective areas of the spherical screen.

The image portions are assembled onto the video screen by recording with a plurality of video cameras and processing the signals with conventional video production units which generate multiple split images at desired locations on the video screen. The image portions are then masked to the shape of the associated section of the spherical screen by templates. Alternatively the image portions may be generated by a digital computer having bit mapped graphics capabilities. The two techniques can be combined for special effects purposes.

OBJECTS OF THE INVENTION

The principal objects of the present invention are: to provide an improved image projection system; to provide such a system which increases the perceived realism of the projected images; to provide such a system in which the portions of the image are viewable in all directions in which a viewer may turn such that the viewer perceives that he or she is completely surrounded by a continuous panoramic scene; to provide one embodiment of a spherical rear projection screen sized to receive a viewer entirely within the screen assembly and including a truncated spherical portion and a planar floor screen portion to support the viewer; to provide such a screen assembly including an opaque enclosure and sets of mirrors to reflect image portions of a continuous panoramic scene simultaneously to all viewing surfaces of the screen assembly; to provide a second embodiment of a screen assembly in which the spherical portion is flexible and which is supported in a nondistorted shape by air pressure; to provide such a modified embodiment including a zipper at a nonviewable location for the entry and exit of the viewer; to provide a third embodiment of a spherical rear projection screen which is sized to surround the head and upper body of the viewer; to provide such a third screen assembly which is rotatably mounted within an opaque enclosure to turn azimuthally such that the viewer can view in all directions; to provide a projection system for such a third screen assembly including a cathode ray tube screen on which a plurality of portions of a continuous panoramic scene are displayed simultaneously on the video screen at selected locations and which are projected onto the spherical screen by a plurality of projection lenses; to provide such spherical projection systems including a graphics computer including a keyboard and other graphics input devices for the creation of computer generated graphics for display on the spherical projection screens; and to provide such spherical projection systems which are economical to manufacture, which greatly increase the realism of images displayed thereon, and which are particularly well adapted for their intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a spherical projection system according to the present invention. The system 1 generally includes a rear projection screen assembly 2 positioned within an opaque enclosure 3. A major portion of the screen assembly 2 is a spherical portion 4. The system 1 includes an image projection unit 5 which projects a plurality of images by way of sets 6 of mirrors onto associated areas of the screen assembly 2. The projection unit 5 and the screen assembly 2 cooperate in such a way to to project a substantially continuous panoramic scene onto the screen assembly such that a viewer sees a respective portion of the scene in any viewable direction.

The screen assembly 2 ilustrated in FIGS. 1-8 includes the spherical portion 4 which is a truncated sphere extending to substantially greater than a hemisphere and which is closed by a planar floor rear projection screen 10. The spherical portion 4 is formed of four side segments 11 and a top segment 12, all of spherical curvature. The segments 11 and 12 have flanges which receive fasteners such as bolts 15 (FIG. 6) to join the segments 11 and 12. The floor screen 10 is surrounded by a floor edge frame 16 (FIG. 7) by which the floor screen 10 is connected to a screen assembly support frame 17 within the enclosure 3. A plurality of fasteners 18 connect lower flanges of the side spherical segments 11 to the support frame 17 through the edge frame 16.

The side segments 11 and top segment 12 are preferably formed of a rigid transparent material such as that sold under the trademark Plexiglas or the like. The floor screen 10 is required to support the weight of a viewer and a chair for the viewer in addition to receiving the images projected thereon without distortion. The side segments 11, top segment 12, and floor screen 10 are assembled in such a manner that the interfaces therebetween, the fasteners joining same, and the support frame 17 do not interfere with the projected images. The illustrated members of the screen assembly 2 are preferably frosted as by etching, sandblasting, or the like on inner surface 19 thereof (FIG. 5) to display the projected images.

Figures 5, 7, 8:
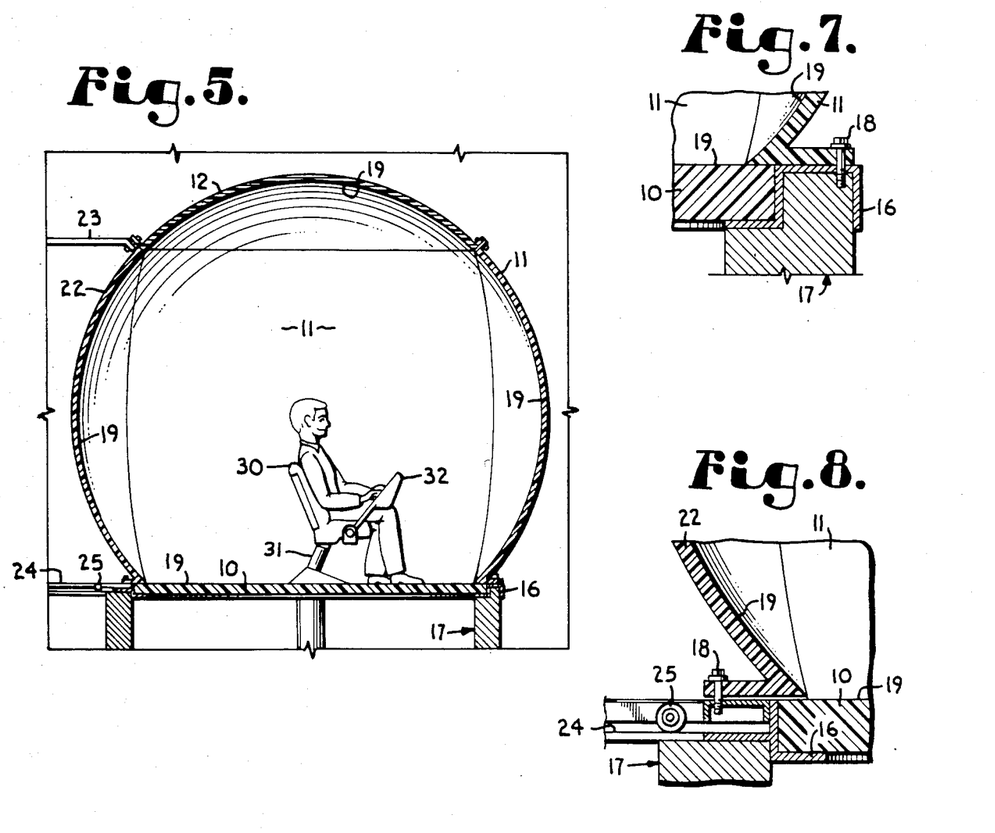
FIG. 5 is an enlarged fragmentary sectional view taken on line 5—5 of FIG. 4 and illustrates details of the system.
FIG. 7 is a greatly enlarged fragmentary sectional view of a lower portion of the spherical portion of the screen assembly and illustrates the placement of fasteners to avoid interference with the projected images.
FIG. 8 is a greatly enlarged fragmentary sectional view of a lower portion of the removable section of the screen assembly.

Since the screen assembly 2 is adapted to be viewed from within, it is necessary to provide a means of entering and leaving the screen assembly 2. In the illustrated screen assembly 2, one of the side segments 11 is separable from the rest of the assembly 2. A door segment 22 of the screen assembly 2 is mounted on a separable framework 23 which is positioned on a pair of tracks 24 on which the framework 23 is slidable by means such as rollers 25 (FIG. 8). The framework 23 and the door segment 22 may be moved either manually or by means of a motor (not shown). The framework 23 includes an opaque covering panel 26 which forms a part of the enclosure 3 when closed. The tracks 24 are positioned on a raised extension 27 of the enclosure 3, and stairs 28 are provided to facilitate access to the screen assembly 2.

The floor screen 10 is provided with a chair 30 on which the viewer sits to view the images projected onto the screen assembly 2. Preferably, the chair 30 is adjustable in height for the comfort of the viewer and to position the viewer's eyes at the approximate origin or center of the spherical portion 4 of the screen assembly. Additionally, it is desirable for the chair 30 to be rotatable about a vertical axis to allow the viewer to view in all azimuthal directions. In order to provide proper ventilation within the screen assembly 2 when closed, air transfer ducts (not shown) may be provided, such as in a pedestal portion 31 of the chair 30. The chair 30 is preferably provided with a viewer interaction device 32 which may include program selection controls. It is foreseen that the system 1 could be used as a simulator for various kinds of vehicles. In such an application, the device 32 might take the form of simulated controls for such vehicles. If the system 1 were employed as an arcade game machine, the interaction device 32 would house game controls. Further, special visual effects for motion pictures to be shown using the system 1 could be created using graphics controls on the interaction device 32 through a graphics computer 33 (FIG. 18) in cooperation with the projection unit 5.

Figure 1:
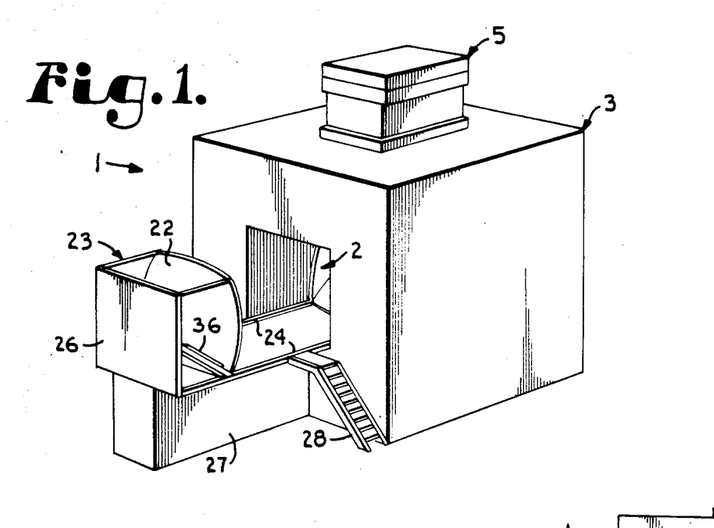
FIG. 1 is a perspective view of an opaque enclosure which houses a spherical projection system according to the present invention and illustrates a portion of a spherical rear projection screen separated to allow the entry and exit of a viewer.
Figure 2:
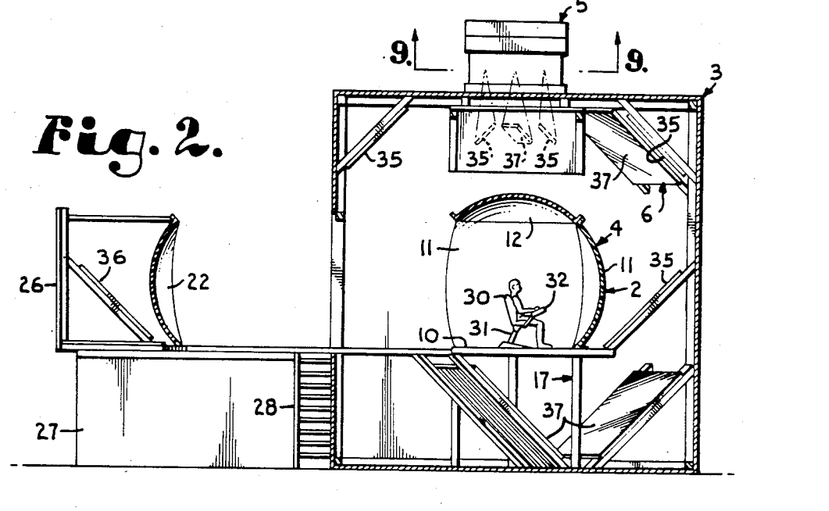
FIG. 2 is a side elevational view of the spherical projection system enclosure with a wall removed to illustrate details of the system.
Figure 3:
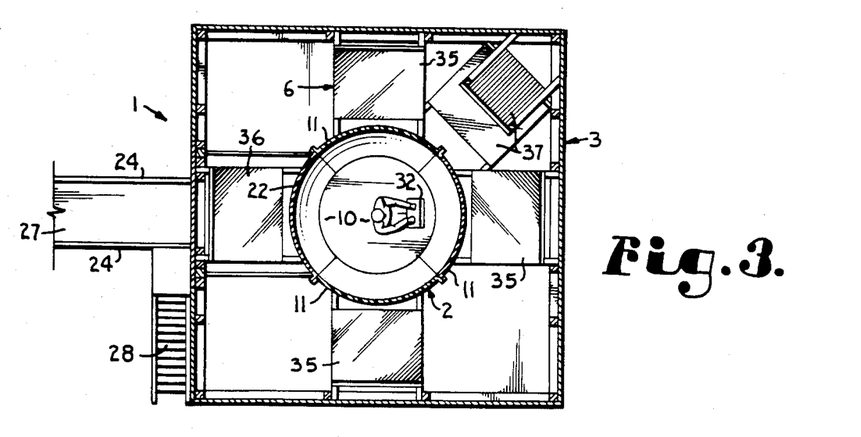
FIG. 3 is a top plan view of the system enclosure with the roof removed to illustrate details of the system.
Figures 4, 6:
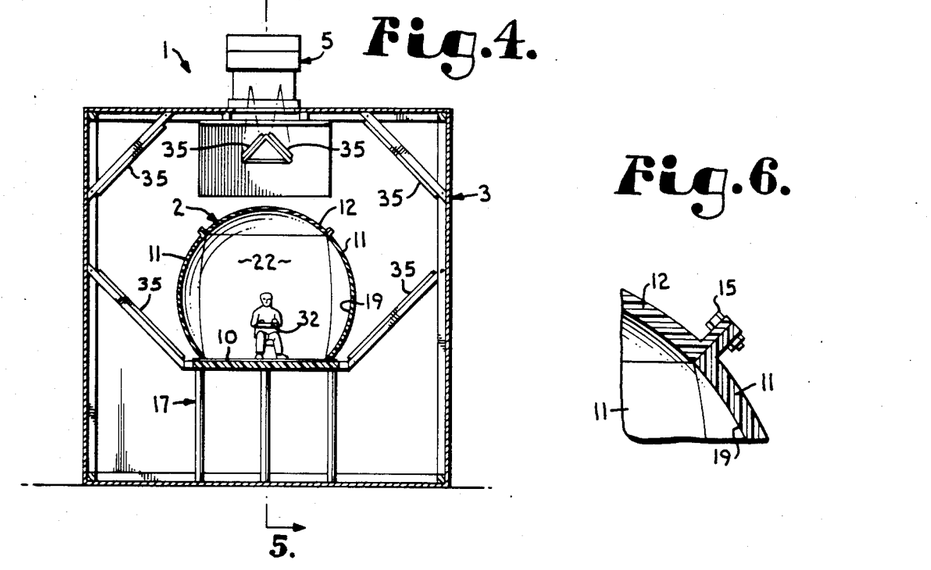
FIG. 4 is a frontal elevational view of the system enclosure with a wall removed.
FIG. 6 is a greatly enlarged fragmentary sectional view of a portion of the spherical rear projection screen assembly and illustrates details of the interconnection of the component sections of the screen assembly.

Images projected from the projection unit 5 are transferred to designated areas of the screen assembly 2 by the mirror sets 6 supported within the enclosure 3. In the illustrated system 1, each of the side segments 11, the top segment 12, and the floor screen 10 receives a separate portion of the total scene. Thus, a set of mirrors is provided for each segment of the screen assembly 2 except the top segment 12. Referring to FIG. 3, four side mirror sets 35 are shown, each consisting of three flat mirrors having front silvered surfaces to reduce image distortion. A final mirror 36 for the door segment 22 is mounted on the separable framework 23. The images for the floor screen 10 are transferred by a floor screen mirror set 37 which includes four mirrors. The images for the top segment 12 may be projected directly from the projection unit 5 to the segment 12. The images intended for the various segments of the screen assembly 2 must be initially right/left reversed or inverted as necessary to accommodate the various numbers of reflections incurred before the images reach their respective screen segment.

The image projection unit 5 may be any type of arrangement capable of projecting an apparently continuous spherical panoramic scene onto the external surfaces of the screen assembly 2 without noticeable distortion. Because most conventional image display devices display images virtually flatly or store images flatly, distortions would arise in projecting such images onto the spherical screen assembly 2. Therefore, it is necessary to pre-distort the images either optically or electronically before projection to compensate such distortions. Because of the large surface area of the screen assembly 2, it is necessary that the projected images be of relatively high luminous intensity so that the displayed images are sufficiently bright. Finally, it is necessary that the outlines of the image portions be properly shaped to avoid overlap of the edges of the image portions on the screen assembly 2.

Figures 9, 10, 11, 12:
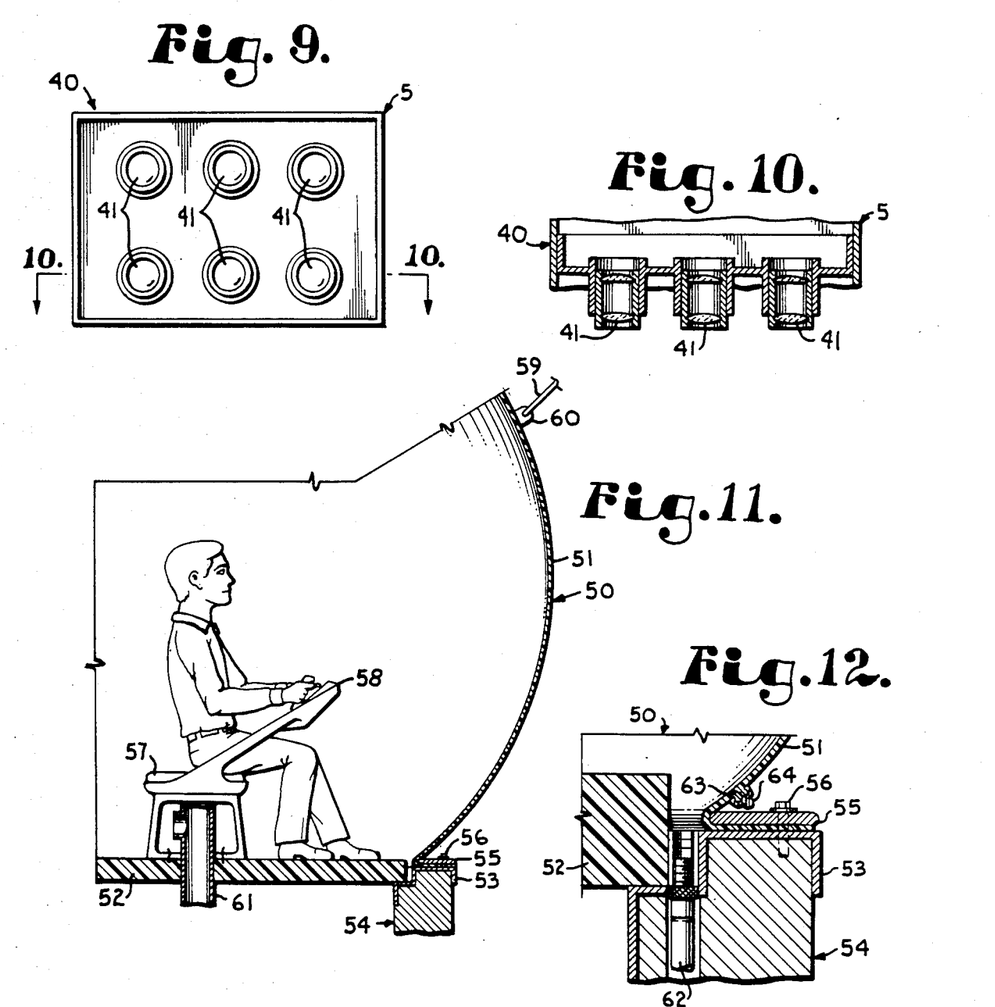
FIG. 9 is an enlarged transverse sectional view taken on line 9—9 of FIG. 2 and illustrates a multiple projection lens assembly for use in projecting images onto the spherical screen assembly.
FIG. 10 is an enlarged sectional view taken on line 10—10 of FIG. 9 and illustrates further details of the projection lens assembly.
FIG. 11 is an enlarged fragmentary sectional view of a second embodiment of the spherical screen assembly in which a flexible spherical portion is pneumatically supported.
FIG. 12 is a greatly enlarged fragmentary sectional view of a portion of the pneumatically supported spherical screen portion and illustrates a zipper which allows entry into and exit from the screen assembly.

In the illustrated system 1, six image portions or segments are projected corresponding to the four side segments 11 of the screen assembly 2, the top segment 12, and the floor screen 10. Referring to FIGS. 9 and 10, a projection lens assembly 40 of the image projection unit 5 is illustrated. The lens assembly 40 includes respective projection lens sets 41 corresponding to the six screen assembly segments 11, 12 and 10. The lens sets 41 project the image segments onto the mirror sets 6 for reflective transfer to the surfaces of the screen assembly 2. The lens sets 41 may receive their images from conventional motion picture projectors, direct projection cathode ray tube (CRT) arrangements, or from another image display screen (image sources not shown).

For the large surface area of the screen assembly 2, the most practical image projector device for video source images is a direct projection CRT device. Among these types of devices are the type of CRT's which are employed in large screen projection television systems such as are available for home use. Generally, these include a small diameter CRT screen which produces a small but intense image which is suitable for projection to a relatively distant screen. Alternatively, the projection unit 5 could employ an Eidophor (trademark) type of video projection system. This type of system employs a thin layer of oil which is electrostatically distorted by a scanned electron beam modulated by a video signal. A high intensity light source, such as a xenon light source, is beamed through the oil film and by way of optical elements to a screen. Both such video projection systems are capable of reproducing color images.

It is known that when an image intended to be projected onto a flat surface is projected onto a spherical surface, the image is "pin cushion" distorted such that a square figure would be rendered with inwardly curved sides. To compensate for such distortion, the original scene must be recorded with lenses which distort in an opposite sense, "barrel distort", or the recorded image must be electronically processed to oppositely distort them or the images must be oppositely distorted during projection. The preferred solution to such distortions is to pre-distort the images during projection such as by the use of aspheric lens elements within the projection lens sets 41. It should be noted that since the floor screen segment 10 is flat, no such correction is required.

In order to prevent overlap of the image segments on the screen assembly 2, the images are projected through masks or templates 43 (indicated diagrammatically in FIG. 17) which are cutouts shaped similar to the shapes of the segments 10, 11, and 12 of the screen assembly 2. For example, the template cutout shapes for the top segment 12 and the floor screen 10 would be circular. The cutout shapes for the side segments 11 would be in the form of squares with rectilinear top and bottom edges and elliptically arced side edges. The templates 43 may be placed either before the projection lens sets 41 or between the lens sets 41 and the screen assembly 2. Alternatively, the shapes of the projected images can be shaped electronically prior to projection.

Figure 13:
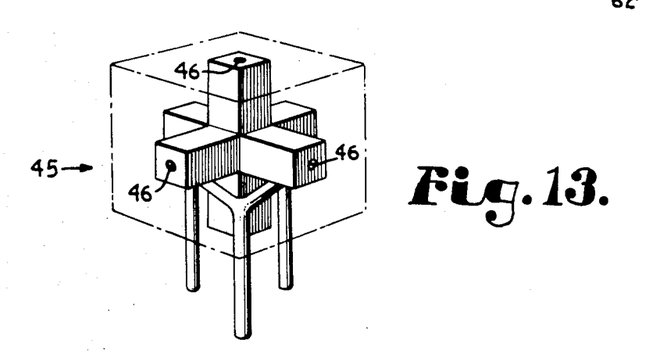
FIG. 13 is a diagrammatic perspective view of a multiple direction lens system for use with cameras for recording images to be projected onto the spherical screen assembly.

FIG. 13 illustrates diagrammatically a taking lens arrangement 45 by which images to be projected onto the screen assembly 2 may be recorded. The lens arrangement 45 may be associated either with photographic cameras or video cameras. The arrangement 45 includes at least six lens sets 46 for recording image segments looking in up and down, left and right, and fore and aft directions. Preferably, the lens sets 46 have wide angles of acceptance such that the image segments recorded by the arrangement overlap somewhat. The image recording media (not shown) associated with the lens sets 46 may be either of square or circular format to maximize the use of the surface areas of such media. Alternatively, separate cameras may be employed for recording the images to be displayed on the screen assembly.

FIGS. 11 and 12 illustrate a second embodiment 50 of the spherical rear projection screen assembly in which a spherical portion 51 of the screen assembly 50 is flexible and is supported principally by pneumatic pressure. The screen assembly 50 is positioned in an opaque enclosure (not shown) similar in many respects to the enclosure 3 which houses the screen assembly 2. A rigid, planar floor rear projection screen 52 includes a floor edge frame 53 which is supported by a screen support frame 54. The flexible spherical screen portion 51 is attached in sealing relationship to the edge frame 53 by segments of an anchor ring 55 and fasteners such as bolts 56. A chair 57 is provided on the floor screen 52 to support a viewer and may include a viewer interaction device 58 similar to the device 32 of the screen assembly 2.

The spherical portion 51 of the screen assembly 50 is supported in a slack state and is stabilized in an inflated state by means such as cables 59 connected to tabs 60 extending from an upper periphery of the spherical screen 51.

The cables 59 may be connected to the enclosure in which the screen 51 is positioned. Pressurized air to inflate the screen 51 to a spherical shape is admitted into the interior of the screen 51 by a duct or ducts positioned preferably out of sight of the viewer to avoid interference with the projected images. In FIG. 11 a central duct 61 is positioned below the chair 57. As shown in FIG. 12, an alternative means of inflating the screen 51 is by a plurality of ducts 62 positioned about and below the periphery of the floor screen 52. The duct 61 or ducts 62 receive air from a blower or compressor (not shown) which is preferably located remotely from the screen assembly 50 to reduce noise. The central duct 61 and peripheral ducts 62 can also be provided in combination with one supplying the air and the other exhausting air to regulate the air pressure within the screen assembly 50. Ventilation for the viewer can also be provided by these means.

In order to allow a viewer to enter and exit the screen assembly 50, the spherical portion 51 is provided with a slit or opening 63 (FIG. 12) at the lower periphery preferably out of sight of the seated viewer. The slit 63 is sealingly closed by means such as a sealing zipper 64 or a sheet closure device known by the trademark Ziploc (Dow Chemical Company). The spherical portion 51 of the screen assembly 50 is preferably formed of a translucent or frosted sheet of material such as Mylar (Du Pont trademark), polyethylene, or the like. The spherical portion may be formed as a single, integral spherical sheet or may be built up from joined segments if the seams between the segments are of such a character that they do not interfere with the projected images. A projection unit (not shown) for projecting images onto the screen assembly 50 and mirror sets (not shown) cooperating therewith are substantially similar to corresponding components of spherical projection system 1.

Figures 14, 15, 16:
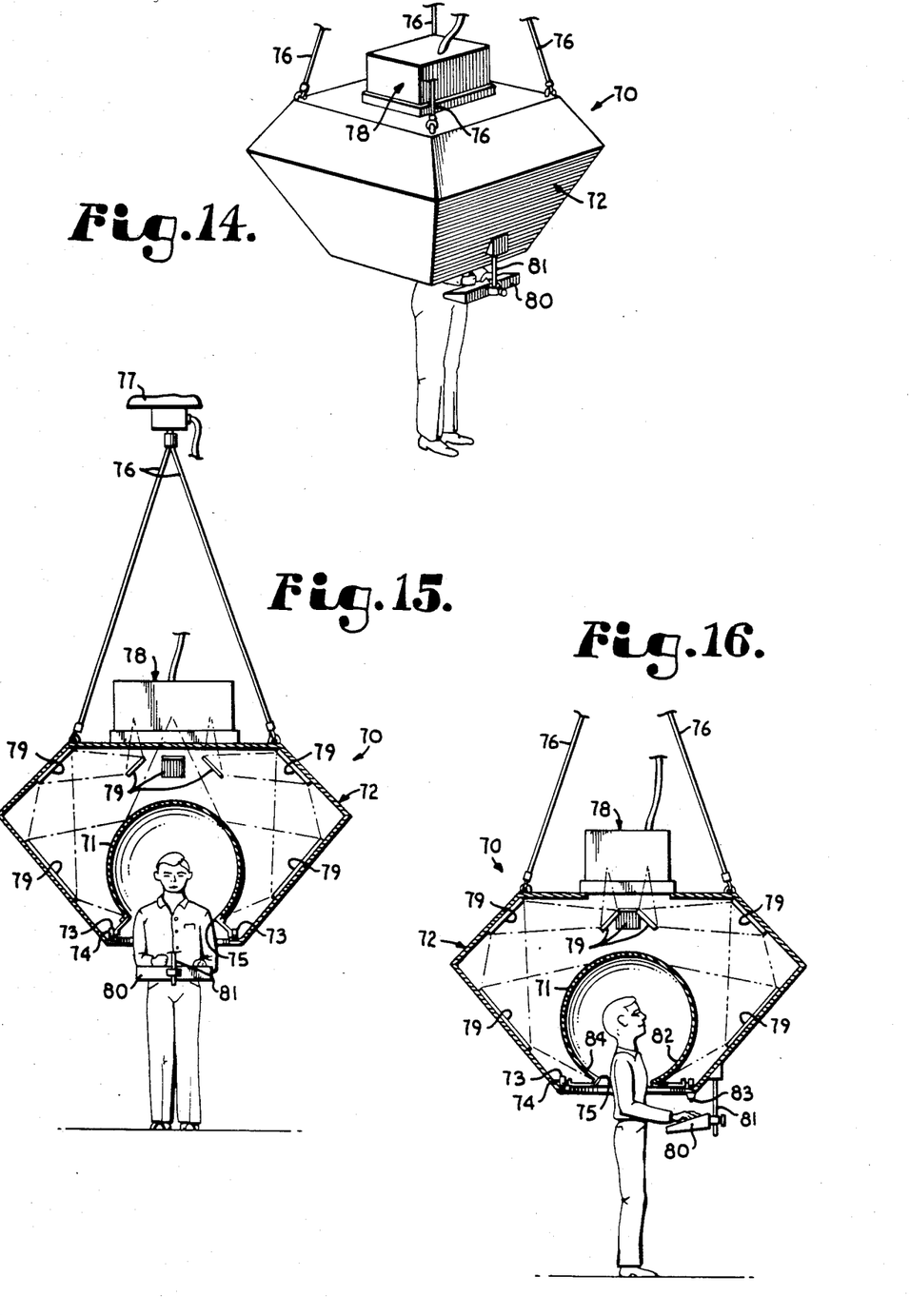
FIG. 14 is a perspective view of a third embodiment of the spherical screen assembly which includes a spherical rear projection screen which is sized to encompass the head and upper body of a viewer.
FIG. 15 is a front elevational sectional view of the third embodiment of the screen assembly.
FIG. 16 is a side elevational sectional view of the third embodiment of the screen assembly.

FIGS. 14–16 illustrate a third embodiment 70 of the spherical projection system according to the present invention. In the compact spherical projection system 70, a spherical rear projection screen member 71 is sized to surround only the head and upper body of the viewer. The screen 71 is rotatably mounted within an opaque enclosure 72 by means of rollers 73 provided about the lower periphery of the screen 71 which travel about a track 74 in the lower part of the enclosure 72. The screen 71 is a rigid one-piece sphere which has a viewer access opening or aperture 75 formed on the lower side thereof to receive the upper body of the viewer. The rollers 73 and track 74 allow the viewer to turn the screen 71 to view all portions of the projected images. The screen 71 may be formed of a glass or plastic which is etched, sandblasted, or otherwise frosted to receive and display rear projected images. The screen 71 preferably has a diameter such that images projected thereon are at a comfortable focal distance from the eyes of a viewer of average visual acuity when the viewer's head is positioned at the center of the screen 71. The enclosure 72 may be supported as by suspending same by cables 76 from another structure 77. Alternatively, the enclosure 72 may be rigidly attached to a mechanism (not shown) capable of raising and lowering the system 70.

The system 70 includes a projection unit 78 similar in many respects to the projection unit 5 of the system 1 for projecting images onto the screen 71. Cooperating with the projection unit 78 are sets of mirrors 79 positioned within the enclosure 72 for reflecting image segments from the unit 78 onto respective areas on the screen 71. The projection unit 78 is operative to project portions of a continuous panoramic scene onto the screen 71. The illustrated projection unit 78 is positioned on the upper side of the enclosure 72. The projection unit 78 differs from the projection unit 5 in that only five image segments are required in the system 70 since there is no lower screen segment corresponding to the floor screen 10 in the system 1.

The illustrated enclosure 72 has a viewer interaction device 80 mounted thereon as by a strut 81 and similar to the device 32 of the system 1. In order to facilitate viewing of the device 80, a lower front portion 82 of the screen 71 may be only partially frosted. Additionally, a light source 83 is positioned on the enclosure 72 and directed toward the device 80. When the light 83 is active, the viewer can see the device 80 through the partially frosted screen portion 82. When the light 83 is extinguished, projected images may be viewed on the lower front portion 82 of the screen 71. The screen 71 may be provided with ventilation ports (not shown) formed in a lower rear portion 84 of the screen 71 where they cannot be seen by the viewer.

Figures 17, 18:
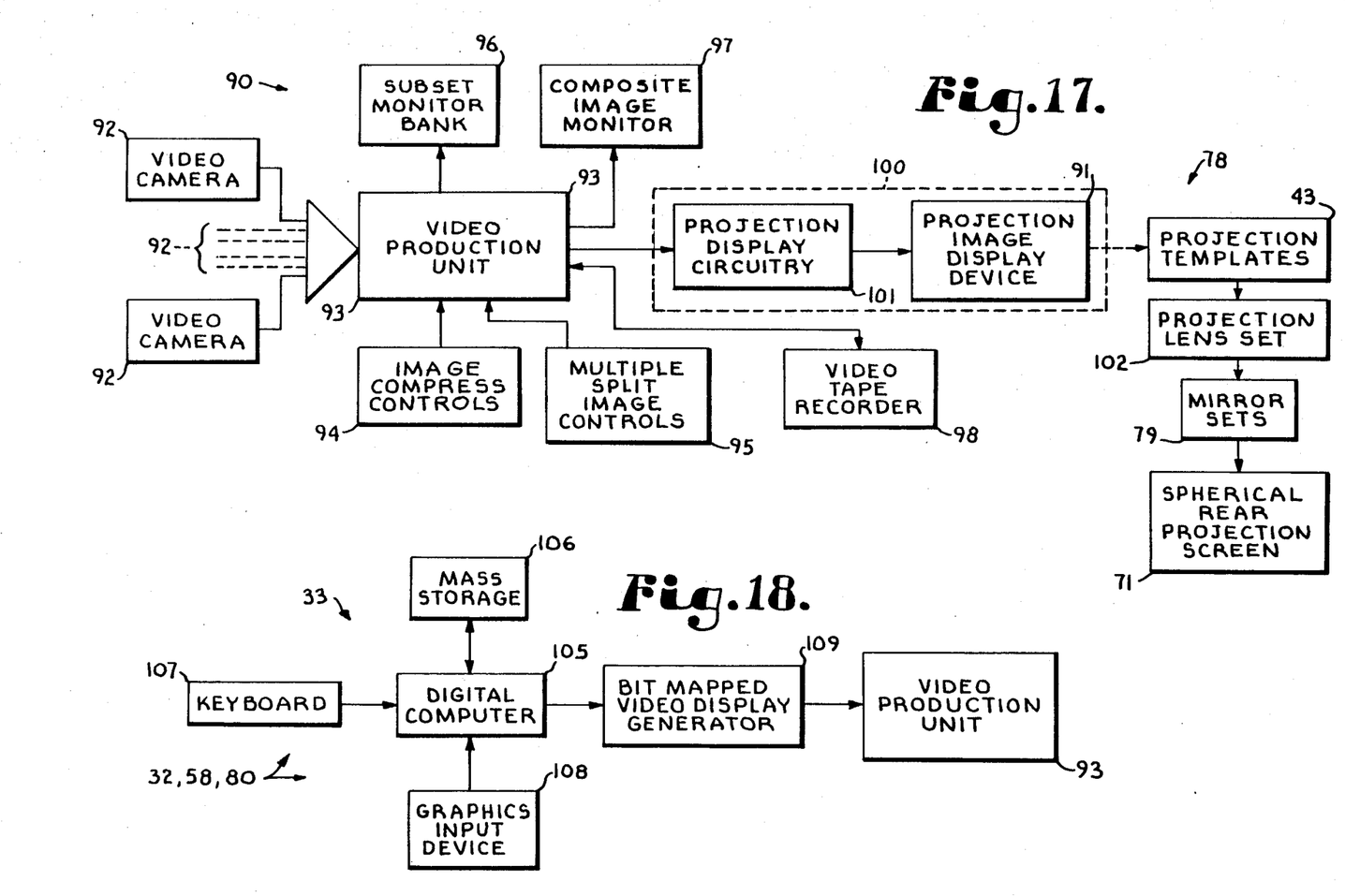
FIG. 17 is a block diagram of an image formatting system for assembling the image segments recorded by a plurality of video cameras onto a single video screen for projection onto the spherical screen assembly of the present invention.
FIG. 18 is a block diagram of a graphics computer system for generating images for projection onto the screen assembly.

FIG. 17 illustrates diagrammatically an image formatting system 90 for assembling image segments to be projected on a spherical rear projection screen. The system 90 is particularly suited for use with the compact system 70 because of the relatively small surface area of the screen member 71. Generally, the formatting system 90 allows a plurality of image segments or subset images to be assembled onto a single image display device 91, such as the screen of a cathode ray tube, for simultaneous reflective projection onto the spherical screen member 71.

The images to be projected are recorded by a plurality of video cameras 92 which may receive the images through a lens assembly such as the lens assembly 45 illustrated in FIG. 13. The video signals having the images encoded therein are applied to separate channels of a conventional video production unit 93. The unit 93 is of the type used in television broadcasting studios for creating visual effects as are commonly seen in television advertising and newscasting, introduction segments of programs, and the like. Such effects include the placement of titles on the screen, split images, the display of news footage behind a newscaster, and so forth. For use in the system 90, the video production unit 93 is required to have at least image compression functions, the ability to create multiple split images, and the ability to position the split images at selected locations on a video screen. The unit 93 includes image compression controls 94 and multiple split image controls 95 for accomplishing such functions. In order to view the quality of the individual image segments, the system 90 preferably includes a subset monitor bank 96 including a video monitor corresponding to each video camera 92. A composite image monitor 97 connected to the unit 93 allows viewing the image segments assembled onto a single screen. The assembled images as processed by the unit 93 and viewed on the composite image monitor 97 may be stored by means of a video tape recorder 98 for future projection.

Generally, the video production unit 93 is employed to compress the dimensions of each of the individual image segments from the cameras 92 using the image compression controls 94. The compressed images are then placed side by side in two horizontal rows in split image fashion using the split image controls 95. The resultant composite image is then displayed on a projection monitor 100 for projection. The projection monitor 100 may include either a conventional color cathode ray tube or display device 91 and compatible display circuitry 101 or may include other types of display devices and suitable driving circuitry therefor. Once the controls 94 and 95 have been set to achieve acceptable results, no further adjustment should be required. The projection monitor 100 may display either real time images that are currently being sensed by the cameras 92 or stored images by playing back a previously recorded tape from the recorder 98.

The image segments on the projection monitor 100 are masked by the projection templates 43 for shaping the image segments to avoid overlap of the edges of the image segments. The masked image segments are then projected by projection lens sets 102 similar to those of the lens assembly 40 toward the sets of mirrors 79 for reflective transfer to the surfaces of the rear projection screen 71.

Referring to FIG. 18, a graphics computer system 33 for generating images to be projected onto the screen assemblies 2, 51, and 70 is illustrated. The system 33 includes a digital computer 105 including a central processing unit, memory, communication ports, and the like. Operating system software, graphics software, processing data, generated images and the like are stored in mass storage devices 106 which may include magnetic disk drives, optical disk drives, and so forth. Commands to operate the computer system 33 and graphics generation commands are entered by means of the viewer interaction devices 32, 58 and 80 which may include a keyboard 107 and a graphics input device 108. The graphics input device 108 may consist of one or more of a joystick, a trackball, a "mouse", a digitizer pad, or other such devices. The computer system 33 includes a bit mapped video display generator 109 wherein each picture element or pixel is accessible for generating high resolution images. The video display generator 109 is connected to one of the channels of the video production unit 93 for displaying the computer generated images through the image formatting system 90. The digital computer 105 may be any type of computer system which has the required processing power and speed such as the type which are employed in computer aided drafting (CAD) applications. The computer system 33 may function as a simulator controller if the spherical projection systems of the present invention are used as simulators or as a game controller if the systems are employed as arcade games. The computer system 90 may also be used to create special visual effects by combining animated scenes with live recorded scenes.

It is to be understood that while certain forms of the present invention have been illustrated and described herein, it is not to be limited to the specific forms or arrangement of parts described and shown.

What is claimed and desired to be secured by Letters Patent is as follows:

1. An image projection system comprising:
   (a) an opaque enclosure;
   (b) rear projection screen means supported within said enclosure, said screen means including at least a portion which is spherically shaped, the spherical portion being substantially greater than a hemisphere, said screen means being adapted to have images projected onto an external surface and to have said images viewed from an internal surface of said screen means;
   (c) image projection means including a plurality of projection lens sets to simultaneously project a plurality of images onto said screen means;
   (d) said screen means having an extent such that a viewer views a respective portion of said images in any viewable direction surrounding the head of the viewer;

(e) said screen means having a diameter such that the head and upper body of a viewer is surrounded by said screen means;
(f) said screen means having an entry aperture at a lower side thereof to admit the head and upper body of a viewer whereby the eyes of the viewer may be positioned at the approximate center of said screen means;
(g) said image projection means including a plurality of sets of mirrors positioned within said enclosure to reflect images from said projection lenses to respective areas of said screen means; and
(h) said screen means being rotatably supported within said enclosure for rotation about a vertical axis such that a viewer positioned therein may rotate said screen means with respect to said enclosure to view images projected onto said screen means in any desired azimuthal direction.

2. An image projection system comprising:
(a) an opaque enclosure;
(b) rear projection screen means support within said enclosure, said screen means including at least a portion which is spherically shaped, the spherical portion being substantially greater than a hemisphere, said screen means being adapted to have images projected onto an external surface and to have said images viewed from an internal surface of said screen means;
(c) image projection means including a plurality of projection lens sets to simultaneously project a plurality of images onto said screen means;
(d) said screen means having an extent such that a viewer views a respective portion of said images in any viewable direction surrounding the head of the viewer;
(e) said screen means being a truncated sphere which is closed at a lower side by a rigid, planar rear projection screen, the planar screen being adapted to have images projected onto a lower surface thereof and to have such images viewed from an upper surface thereof;
(f) said screen means having a diameter to receive a viewer entirely within said screen means;
(g) viewer support means being positioned on said planar screen to position the eyes of a viewer within said screen means at the approximate center of said screen means;
(h) an entry portion of said screen means being separable from the rest of said screen means to allow the entry and exit of a viewer of said images;
(i) said entry portion being a lateral segment of said spherical portion of said screen means; and
(j) said entry portion being mounted on a track to slide substantially horizontally away from the rest of said spherical portion to allow said entry and exit.

3. An image projection system comprising:
(a) an opaque enclosure;
(b) a truncated spherical rear projection screen supported within said enclosure, said screen being adapted to have images projected onto an external surface thereof and to have images viewed on an internal surface thereof, and said screen encompassing a spherical volume substantially greater than a hemisphere;
(c) a rigid, planar rear projection screen positioned to close a lower side of said truncated spherical screen, said planar screen being adapted to have images projected onto a lower surface thereof and to have same viewed on an upper surface thereof, said spherical screen and said planar screen forming a screen assembly;
(d) an entry portion of one of said screens being separable to allow the entry and exit of a viewer of said images;
(e) viewer support means positioned on said planar screen to position the eyes of a viewer within said screen assembly at the approximate center of said spherical screen;
(f) image projection means positioned to project images onto said screen assembly;
(g) said entry portion being a lateral portion of said spherical screen; and
(h) said entry portion being mounted on a track to slide substantially horizontally away from the rest of said spherical screen to allow said entry and exit.

4. An image projection system comprising:
(a) an opaque enclosure;
(b) a truncated spherical rear projection screen rotatably supported within said enclosure, said screen being adapted to have images projected onto an external surface thereof and to have said images viewed on an internal surface thereof, said screen encompassing a spherical volume substantially greater than a hemisphere and being sized to surround the head and upper body of a viewer;
(c) an illuminated image display device to display a plurality of subset pictures to be projected onto said screen;
(d) a plurality of projection lenses positioned in relation to said display device to project respective ones of the subset pictures; and
(e) a plurality of sets of mirrors positioned within said enclosure to reflect the respective subset pictures from said projection lenses onto respective areas of said spherical screen.

5. A system as set forth in claim 4 wherein the subset pictures displayed on said image display device are assembled by the combination of:
(a) a plurality of video cameras recording a plurality of scenes and generating respective video signals representing said scenes;
(b) a television production switcher device including an image compression unit and a multiple split image generator; said switcher device receiving said video signals, processing said video signals with said compression unit to reduce the dimensions of the images represented thereby to a selected fraction of full frame dimensions resulting in compressed video signals, and processing said compressed video signals with said split image generator to cause the images represented thereby to be selectively positioned in a single video image frame as said subset pictures resulting in a split image video signal; and
(c) video monitor circuit means connected between said switcher device and said image display device and causing an image represented by said split image video signal to be displayed on said image display device.

6. A system as set forth in claim 4 including:
(a) a digital computer including a pixel programmable video display generator;
(b) said video display generator being operatively connected to said image display device;

(c) graphics input means positioned on said enclosure and operatively connected to said computer to be operated by a viewer to cause the generation, alteration, and display of images on said display device; and (d) a selectively operable high intensity light source positioned on said enclosure and directed at said graphic input means whereby said graphics input means is visible to a viewer through said spherical screen when said light source is in operation.

7. A system as set forth in claim 4 including:

(a) an entry aperture at a lower side of said screen to admit the head and upper body of a viewer of images on said screen whereby the eyes of the viewer may be positioned at the approximate center of said spherical screen.

8. An image projection system comprising:

(a) an opaque enclosure;

(b) rear projection screen means supported within said enclosure, said screen means including at least a portion which is spherically shaped, the spherical portion being substantially greater than a hemisphere, said screen means being adapted to have images projected onto an external surface and to have said images viewed from an internal surface of said screen means;

(c) image projection means including a plurality of projection lens sets to simultaneously project a plurality of images onto uaid screen means;

(d) said screen means having an extent such that a viewer views a respective portion of said images in any viewable direction surrounding the head of the viewer;

(e) said screen means being a truncated sphere which is closed at a lower side by a rigid, planar rear projection screen, the planar screen being adapted to have images projected onto a lower surface thereof and to have such images viewed from an upper surface thereof;

(f) said screen means having a diameter to receive a viewer entriely within said screen means; and (g) viewer support means being positioned on said planar screen to position the eyes of a viewer within said screen means at the approximate center of said screen means.

9. A system as set forth in claim 8 wherein:

(a) an entry portion of said screen means is separable from the rest of said screen means to allow the entry and exit of a viewer of said images.

10. A system as set forth in claim 8 wherein said image projection means includes:

(a) an illuminated image display device to display a plurality of subset pictures to be projected onto said screen means;

(b) said plurality of projection lenses being positioned in relation to said display device to project respective ones of the subset pictures;

(c) a plurality of sets of mirrors positioned within said enclosure to reflect the respective subset pictures from said projection lenses onto respective areas of said screen means; and (d) the subset pictures displayed on said image display device being assembled by the combination of:

(1) a plurality of video cameras recording a plurality of scenes and generating respective video signals representing said scenes;

(2) a television production switcher device including an image compression unit and a multiple split image generator; said switcher device receiving said video signals, processing said video signals with said compression unit to reduce the dimensions of the images represented thereby to a selected fraction of full frame dimensions resulting in compressed video signals, and processing said compressed video signals with said split image generator to cause the images represented thereby to be selectively positioned in a single video image frame as said subset pictures resulting in a split image video signal; and (3) video monitor circuit means connected between said switcher device and said image display device and causing an image represented by said split image video signal to be displayed on said image display device.

11. A system as set forth in claim 8 including:

(a) a digital computer including a pixel programmable video display generator;

(b) said video display generator being operatively connected to said image projection means; and (c) graphics input means positioned within said screen means and operatively connected to said computer to be operated by a viewer to cause the generation, alteration, and display of images by said image projection means.

12. A system as set forth in claim 8 wherein:

(a) said image projection means is operative to simultaneously project portions of a continuous panoramic scene onto substantially all the image receiving surface of said screen means.

13. A system as set forth in claim 8 wherein:

(a) said image projection means is operative to simultaneously project portions of a continuous panoramic scene onto substantially all the image receiving surfaces of said screen assembly.

14. A system as set forth in claim 8 wherein:

(a) said image projection means is a multiple image projection unit including a plurality of projection lenses;

(b) said projection unit is mounted externally on said enclosure; and (c) mirror sets reflect respective images from said lenses to associated portions of said screen assembly.

15. A system as set forth in claim 14 wherein:

(a) each of said projection lenses except one which is associated with said planar screen includes a respective pre-projection distortion lens to compensate for the distortion arising from the projection of a substantially flat image onto a spherical screen surface.

* * * * *